US006760584B2

(12) United States Patent
Jou

(10) Patent No.: US 6,760,584 B2
(45) Date of Patent: Jul. 6, 2004

(54) SYSTEM FOR TRANSMITTING AND RECEIVING SHORT MESSAGE SERVICE (SMS) MESSAGES

(75) Inventor: Yu-Cheun Jou, San Diego, CA (US)

(73) Assignee: Qualcomm, Incorporated ( * ) Notice: Subject to any disclaimer, the term of this patent is extended or adjusted under 35 U.S.C. 154(b) by 0 days.

(21) Appl. No.: 10/290,584

(22) Filed: Nov. 8, 2002

(65) Prior Publication Data

US 2003/0125052 A1 Jul. 3, 2003

Related U.S. Application Data

(63) Continuation of application No. 09/495,788, filed on Feb. 1, 2000, now Pat. No. 6,505,052.

(51) Int. Cl.[7] ................................................ H04Q 7/20
(52) U.S. Cl. ....................... 455/434; 455/466; 455/67.1
(58) Field of Search ............................... 455/434, 67.1, 455/466, 500, 61, 515, 458, 455, 464, 517, 516, 88, 509, 450; 379/92.01; 370/312, 503, 430, 358, 336, 337, 329, 324, 346, 348, 355

(56) References Cited

U.S. PATENT DOCUMENTS

| 4,901,307 A | | 2/1990 | Gilhousen et al. |
|---|---|---|---|
| 5,103,459 A | | 4/1992 | Gilhousen et al. |
| 5,509,015 A | * | 4/1996 | Tiedemann, Jr. et al. .. 370/95.3 |
| 5,604,744 A | * | 2/1997 | Andersson et al. ......... 370/347 |
| 5,613,211 A | * | 3/1997 | Matsuno ..................... 455/51.1 |
| 5,754,626 A | * | 5/1998 | Otonari ......................... 379/61 |
| 5,896,561 A | * | 4/1999 | Schrader et al. ........... 455/67.1 |
| 5,909,651 A | | 6/1999 | Chander et al. |
| 5,974,092 A | * | 10/1999 | Roos et al. ................. 375/272 |
| 6,505,052 B1 | * | 1/2003 | Jou ............................ 455/466 |
| 2003/0072331 A1 | * | 4/2003 | Jou ............................ 370/503 |

FOREIGN PATENT DOCUMENTS

| WO | 9322883 | 11/1993 |
|---|---|---|
| WO | 9921390 | 4/1999 |
| WO | 0010353 | 2/2000 |
| WO | 0022837 | 4/2000 |

* cited by examiner

Primary Examiner—Edward F. Urban
Assistant Examiner—C. Chow
(74) Attorney, Agent, or Firm—Philip R. Wadsworth; Thien T. Nguyen; S. Hossain Beladi

(57) ABSTRACT

A system for accessing broadcast SMS messages over a wireless communication system. A base station transmits SMS messages periodically and aperiodically over a broadcast channel. The base station allocates periodic slots in the broadcast channel for each of the subscriber services providing the SMS messages and transmits slot parameters to mobile units. Using the slot parameter information, the mobile units periodically wake up to scan the broadcast channel. The period for each category of broadcast SMS messages may be different and the period may apply to a single broadcast channel. Messages arriving aperiodically can be queued and transmitted in pre-scheduled broadcast channel frames. Messages with inter-arrival interval greater than the specified transmission period are simply repeated.

10 Claims, 4 Drawing Sheets

SYSTEM FOR TRANSMITTING AND RECEIVING SHORT MESSAGE SERVICE (SMS) MESSAGES

This is a continuation of Ser. No. 09/495,788 filed Feb. 1, 2000, now U.S. Pat. No. 6,505,052.

BACKGROUND OF THE INVENTION

I. Field of the Invention

The present invention pertains generally to the field of communications, and more particularly to the broadcast of short message service for wireless communication systems.

II. Background

In a wireless communication system, the broadcast short message service (SMS) allows the transmission of short messages from a subscription service to a mobile unit. Generally, broadcast SMS messages are messages associated with services subscribed to by a user. Broadcast SMS can comprise entry features, administration features, or information messages. For example, a subscriber may subscribe to a stock quotes service wherein the subscriber will receive stock quotes on a wireless device or a mobile unit, such as a personal data assistant (PDA), laptop computer, a cellular telephone or a PCS telephone, from a subscription service utilizing the wireless communication system.

Various over-the-air interfaces have been developed for wireless communication systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile Communications (GSM), and Interim Standard 95 (IS-95).

An exemplary wireless telephony communication system is a code division multiple access (CDMA) system. The IS-95 standard and its derivatives, IS-95A, IS-95B, IS-2000, proposed high-data-rate CDMA standards exclusively for data, etc. (referred to collectively herein as IS-95), are promulgated by the Telecommunication Industry Association (TIA) and other well known standards bodies to specify the use of a CDMA over-the-air interface for cellular or PCS telephony communication systems. Exemplary wireless communication systems configured substantially in accordance with the use of the IS-95 standard are described in U.S. Pat. Nos. 5,103,459 and 4,901,307, which are assigned to the assignee of the present invention and fully incorporated herein by reference.

A problem arises when a broadcast SMS message is transmitted over the wireless communication system. The mobile units that are subscribers to the subscription service must acquire the broadcast SMS message in a timely manner, but in order to do so, the mobile units must be awakened from an idle state. The process of "waking up" from the idle state, demodulating the SMS message broadcast from a base station, and then returning to the idle state involves a power drain on each mobile unit's battery that can measurably diminish the power level of the mobile unit's battery. The length of time in which the mobile unit spends awake is approximately proportional to the power consumption of the mobile unit.

Hence, there is a present need to minimize the total battery drain of the mobile unit while allowing the mobile unit to detect and process broadcast SMS messages in a timely manner.

SUMMARY

The present invention is directed to a method for transmitting and receiving broadcast SMS messages over a broadcast channel in a wireless communication system, comprising the steps of: generating a parameter message to be broadcast from a base station to a mobile unit, wherein the parameter message contains a set of transmission parameters for the broadcast channel; processing the parameter message at the mobile unit; and setting a periodic wake up schedule for the mobile unit in accordance with the set of transmission parameters, wherein the mobile unit wakes up periodically in order to detect a broadcast SMS message in one or more assigned broadcast channel frames. The period for each category of broadcast SMS messages may be different and the period may apply to a single broadcast channel. Messages arriving aperiodically can be queued and transmitted in pre-scheduled broadcast channel frames. Messages with inter-arrival interval greater than the specified transmission period are simply repeated.

DETAILED DESCRIPTION OF THE PREFERRED EMBODIMENTS

Figure 1:
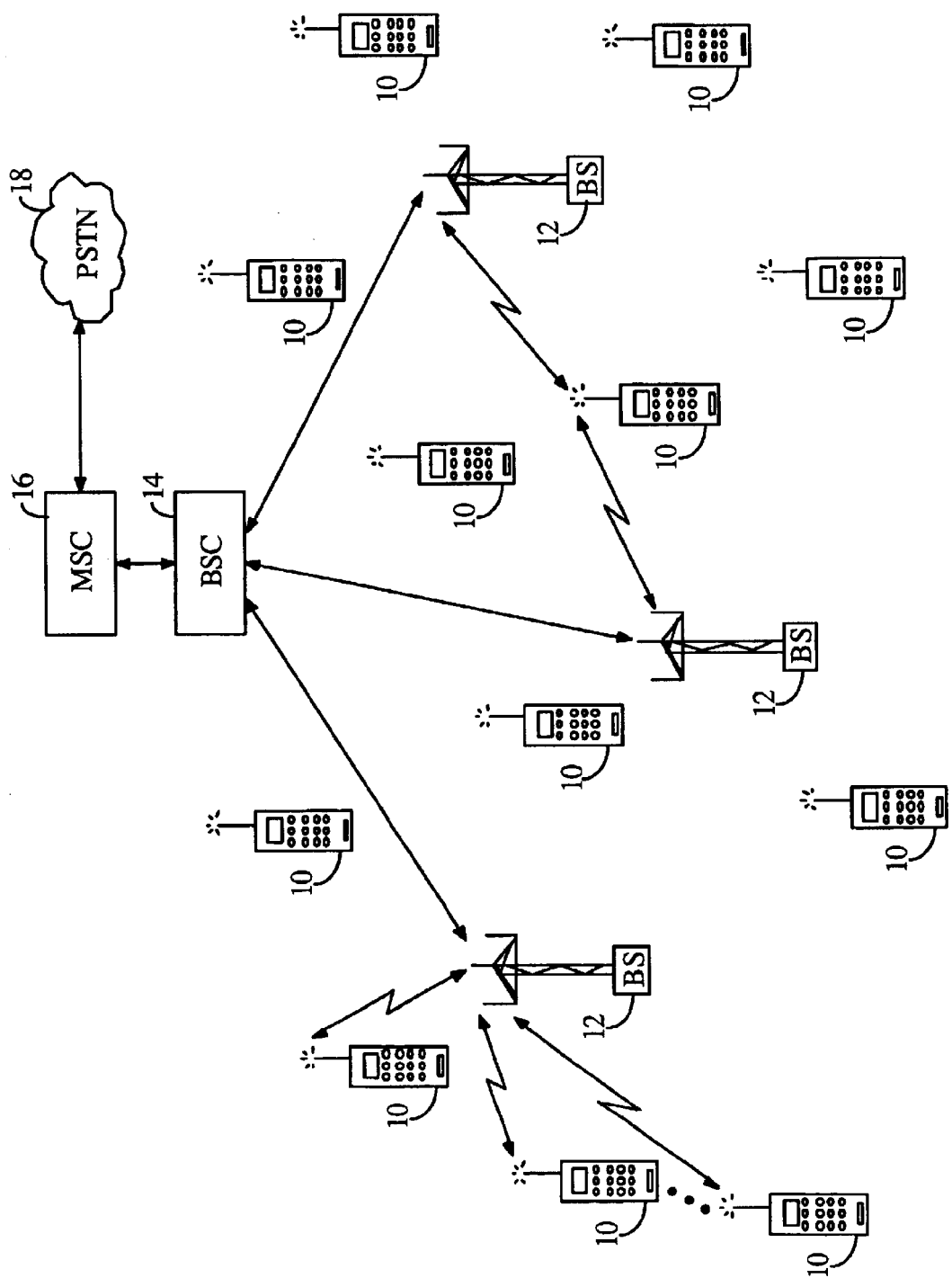
FIG. 1 is a block diagram of a cellular telephone system.

The present invention pertains to a system for transmitting SMS messages on a broadcast channel. An exemplary wireless communication system in which the present invention is embodied is illustrated in FIG. 1. In a preferred embodiment, the communication system is a CDMA wireless communication system, although it should be understood that the present invention is equally applicable to other types of communication systems. Systems utilizing other well-known transmission modulation schemes such as TDMA and FDMA as well as other spread spectrum systems may employ the present invention.

As illustrated in FIG. 1, a CDMA wireless telephone system generally includes a plurality of mobile subscriber units 10, a plurality of base stations 12, base station controllers (BSCs) 14, and a mobile switching center (MSC) 16. The MSC 16 is configured to interface with a conventional public switch telephone network (PSTN) 18. The MSC 16 is also configured to interface with the BSCs 14. The BSCs 14 are coupled to the base stations 12 via backhaul lines. The backhaul lines may be configured to support any of several known interfaces including, e.g., E1/T1, ATM, IP, PPP, Frame Relay, HDSL, ADSL, or xDSL. It is understood that there may be more than two BSCs 14 in the system. Each base station 12 advantageously includes at least one sector (not shown), each sector comprising an omnidirectional antenna or an antenna pointed in a particular direction radially away from the base station 12. Alternatively, each sector may comprise two antennas for diversity reception. Each base station 12 may advantageously be designed to support a plurality of frequency assignments. The intersection of a sector and a frequency assignment may be referred to as a CDMA channel. The base stations 12 may also be known as base station transceiver subsystems (BTSs) 12. Alternatively, "base station" may be used in the industry to refer collectively to a BSC 14 and one or more BTSs 12. The BTSs 12 may also be denoted "cell sites" 12. Alternatively, individual sectors of a given BTS 12 may be referred to as cell sites. The mobile subscriber units 10 are typically cellular or PCS telephones 10. The system is advantageously configured for use in accordance with the IS-95 standard.

During typical operation of the cellular telephone system, the base stations 12 receive sets of reverse link signals from sets of mobile units 10. The mobile units 10 are conducting telephone calls or other communications. Each reverse link signal received by a given base station 12 is processed within that base station 12. The resulting data is forwarded to the BSCs 14. The BSCs 14 provides call resource allocation and mobility management functionality including the orchestration of soft handoffs between base stations 12. The BSCs 14 also routes the received data to the MSC 16, which provides additional routing services for interface with the PSTN 18. Similarly, the PSTN 18 interfaces with the MSC 16, and the MSC 16 interfaces with the BSCs 14, which in turn control the base stations 12 to transmit sets of forward link signals to sets of mobile units 10.

Figure 2:
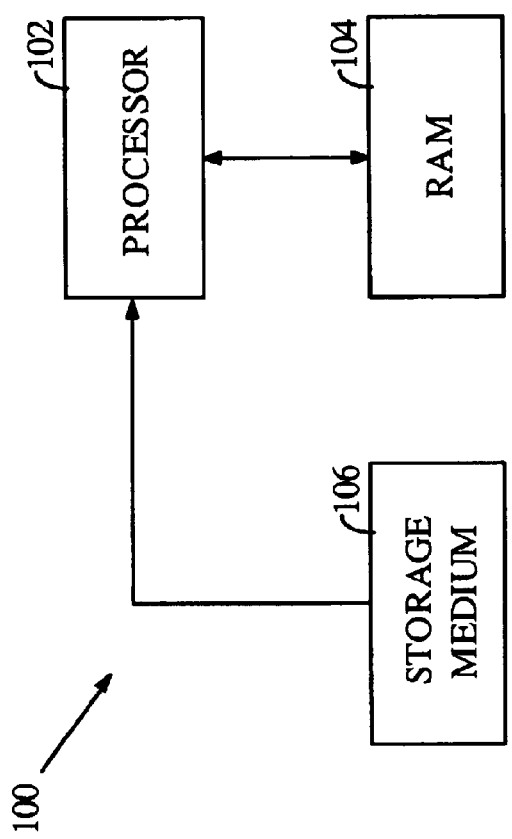
FIG. 2 is a block diagram of a processor and associated memory elements used to generate a transmission parameter message.

In accordance with the exemplary wireless communication system, FIG. 2 shows a mechanism 100 for generating a transmission parameter message including a processor 102, a software module 104, and a storage medium 106. The processor 102 is advantageously a microprocessor or a special-purpose processor such as a digital signal processor (DSP), but may in the alternative be any conventional form of processor, controller, microcontroller, or state machine. The processor 102 is coupled to the software module 104, which is advantageously implemented as RAM memory holding software instructions that direct the operation of the processor 102. The software instructions can comprise a software program or a set of microcodes. The RAM memory 104 may be on-board RAM, or the processor 102 and the RAM memory 104 could reside in an ASIC. In an alternate embodiment, firmware instructions are substituted for the software module 104. The storage medium 106 is coupled to the processor 102, and is advantageously implemented as a combination of RAM memory and any form of conventional nonvolatile memory such as, e.g., ROM memory. The storage medium 106 is used to store precomputed tables and instructions. For example, the instructions and tables are stored in the ROM memory component while the register is stored in the RAM memory component. In the alternative, the storage medium 106 could be implemented as either a disk memory or a flash memory that is accessible by the processor 102. In the alternative, the storage medium 106 may be implemented as registers. The mechanism 100 may reside in any conventional communications device such as, e.g., the mobile subscriber units 10 or the base stations 12 in the CDMA wireless telephone system of FIG. 1.

Figure 3:
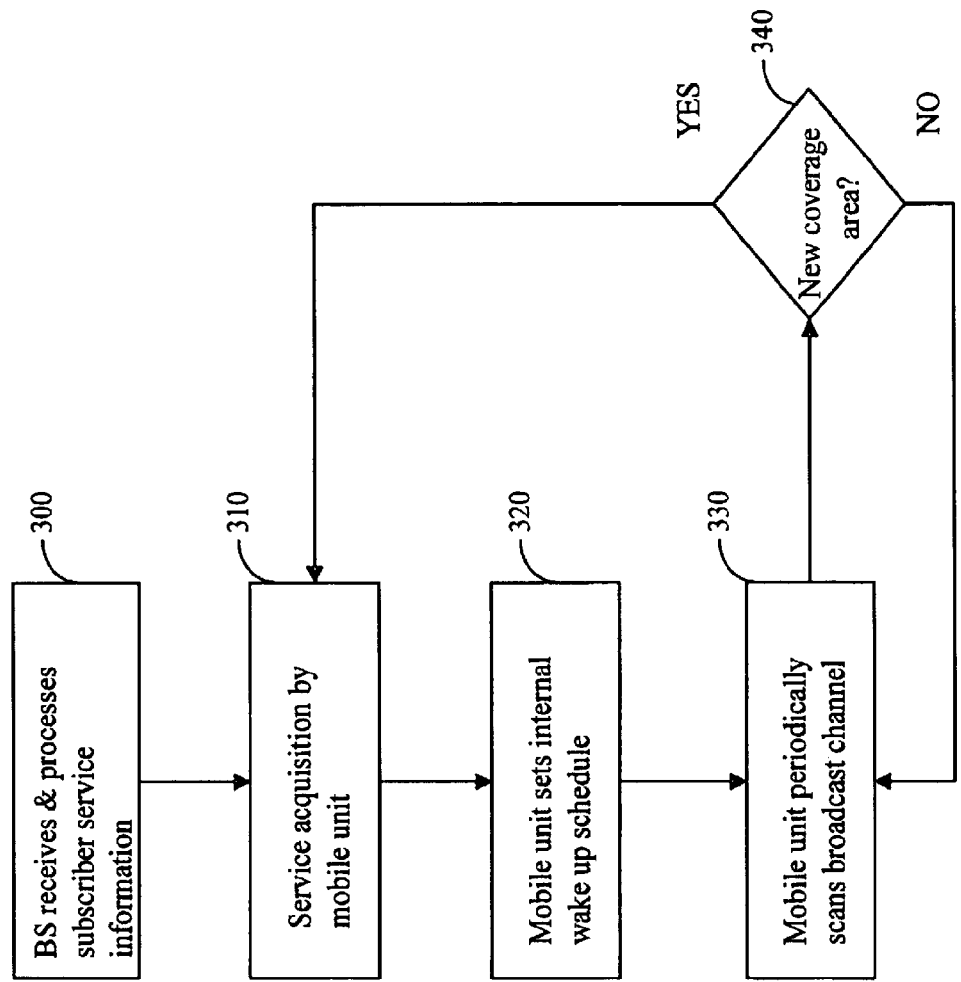
FIG. 3 is a flow chart of one embodiment of the invention.

FIG. 3 is a block diagram illustrating an embodiment of the invention, wherein SMS messages are broadcast periodically or aperiodically from a base station throughout the base station's coverage area. At step 300, a base station receives subscriber service information from subscriber services. It should be understood that the base station may receive information from subscriber services at any time. At step 310, a mobile unit enters the coverage area of a base station and acquires system parameters from the base station. System parameters include subscriber service transmission parameters that define the wake up schedule for mobile units that have subscribed to a subscription service. At step 320, the mobile unit processes the subscriber service transmission parameters and sets an internal wake up schedule accordingly. At step 330, the mobile unit begins to follow the internal wake up schedule, wherein the mobile unit wakes up from an idle state to periodically scan the broadcast channel for SMS messages. At step 340, the method described herein is repeated each time a mobile unit enters the coverage area of a new base station. It is understood that all base stations in the wireless communication system will be receiving the subscriber service information from subscriber services.

The subscriber service transmission parameter message from the base station may be transmitted periodically or aperiodically to the mobile units that are subscribers to a service in the coverage area. The subscriber service transmission parameter message instructs the mobile units when to wake up from an idle state, demodulate the SMS message that may be carried on the broadcast channel, and when to return to an idle state while the mobile units remain in the coverage area of the base station. Table 1 contains some of the specific parameters that may be transmitted by the base station.

TABLE 1

| Parameter | Units | # of Bits |
|---|---|---|
| Message Category | N/A | 16 |
| Minimum Transmission Period (MTP) | 1.28 sec. intervals | 8 |
| Transmission Period | MTPs | 9 or 11 |
| Transmission Offset from System Time in the Minimum Transmission Period | BCCH frames | Up to 13 |
| Transmission Offset from System Time in the Transmission Period | MTPs | 9 or 11 |
| Number of Repetitions | N/A | 2 |
| Separation Between Repetitions | MTPs | 2 |
| Burst Length | BCCH frames | 10 |

System time is the time reference used by the base station and is synchronous to Universal Coordinated Time (UTC), which is an internationally agreed-upon time maintained by the Bureau International de l'Heure (BIH). Values are assigned to the parameters that correspond to the desired broadcast schedule of each service. The Minimum Transmission Period (MTP) parameter specifies the cycle duration in units of 1.28 seconds. The numerical value of 1.28 seconds is the minimum slot cycle for mobile stations operating in the slotted mode according to IS-95. However, it should be understood that this numerical value could be modified without limiting the scope of this invention.

The Transmission Period Parameter is defined in units of MTP and can be set so that transmission periods will occur up to a maximum limit of a day (9 bits) or a week (11 bits), according to system parameters. The Transmission Period parameter can be determined from the average or maximum rate at which new messages arrive. For example, if a SMS message from a subscription service arrives at the base station once every 15 minutes, then the Transmission Period for the slot assigned to that subscription service should be set to be less than or equal to 15 minutes.

The Transmission Offset from System Time in the MTP parameter is defined in units of broadcast channel (BCCH) frames and is used to identify which slot in the MTP is assigned to a specific service. The Transmission Offset from System Time in the Transmission Period parameter is defined in units of MTP and is used to identify which slot in the transmission period is assigned to a specific service. The Separation Between Repetitions parameter is defined in units of MTP. Repeated transmissions with short separation are used to support services that have very long transmission periods. Burst Length is defined in units of BCCH frames and is used to support messages that are longer than a broadcast channel frame.

Using these specific parameters, a base station can choose an arbitrary minimum transmission period that can be divided into slots corresponding to the broadcast channel frames, which may be 40 ms, 80 ms, or 160 ms long or as otherwise defined. The base station can transmit broadcast SMS messages on the broadcast channel repeatedly, with repetitions of the broadcast SMS message sent in consecutive frames, or in frames separated by a fixed time interval. The transmission schedule that is transmitted from the base station to the mobile unit gives the mobile unit the ability to power up for those prearranged times when a broadcast SMS message is to be transmitted. In addition, the transmission schedule gives the base station flexibility in structuring the SMS message.

Figure 4:
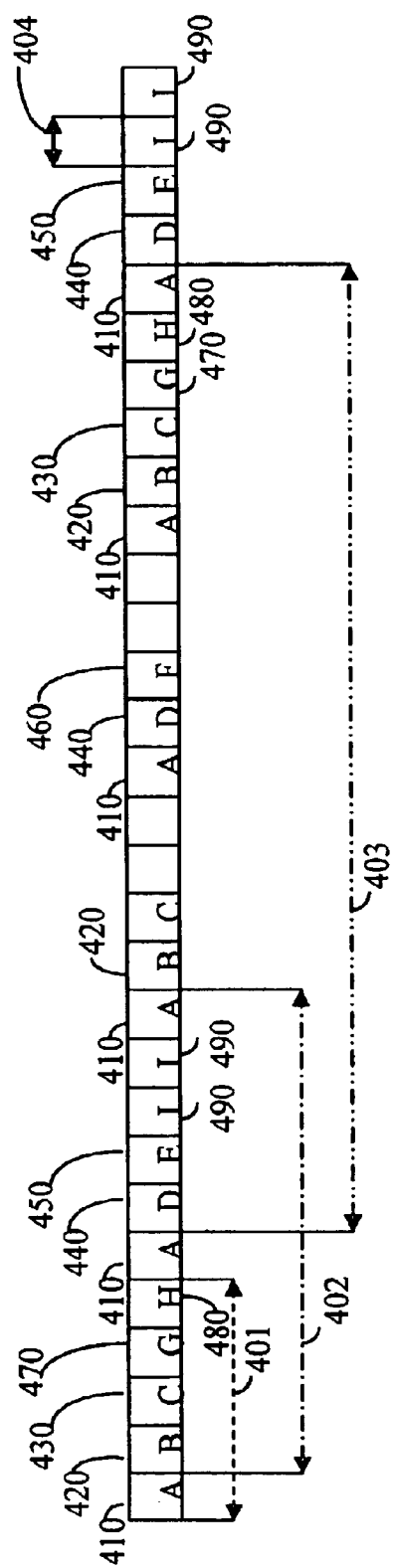
FIG. 4 is a timeline of transmission periods for a broadcast channel.

Using the subscriber service transmission parameters, a mobile unit can scan for specific SMS messages over assigned slots in the broadcast channel. For example, FIG. 4 is a timeline of exemplary transmission periods over a broadcast channel, wherein the broadcast SMS messages are structured flexibly. The length of the broadcast SMS message can be a fraction of the length of a broadcast channel frame, the length of a broadcast channel frame, or a multiple of the length of a broadcast channel frame. The transmission period for service A 410 is equal to the minimum transmission period 401. The transmission period 402 for services B 420, C 430, and D 440 is twice the minimum transmission period 401. The transmission period 403 for services E 450, F 460, G 470, H 480, and I 490 is four times the minimum transmission period 401. Each message for services A 410 through H 480 has the duration of one broadcast channel frame 404 and each message for service I 490 spans over two broadcast channel frames.

For those messages from subscriber services that may not be previously scheduled, i.e., emergency news or breaking news stories, the base station may have a designated service slot that remains empty during regular periods, but can be used to carry unscheduled SMS messages at appropriate times.

In another embodiment of the invention, the minimum transmission period of the broadcast channel frames can be arbitrarily lengthened to increase the subscriber service capacity of the wireless communication system. In wireless devices that are broadcast SMS enabled only, i.e., laptops, PDAs, pagers, and other data devices, the necessity of constant scans for incoming voice calls is eliminated. In cellular and PCS mobile phones with data capabilities, the service configuration between the base station and the mobile phone unit include service options for both voice and SMS messages (data). Because of the voice service option, the slot cycle for most systems have been set to 1.28 seconds or 2.56 seconds, which would allow mobile units to detect the presence of incoming voice calls in a timely manner. Longer periods increase the probability that a calling party will disconnect the phone call before the mobile unit detects the signal or the mobile unit can notify the user.

However, in wireless devices that are not voice-enabled, the constraint of a short slot cycle is essentially eliminated. The base station can lengthen the minimum transmission period arbitrarily so that broadcast SMS messages can be scheduled for transmission once a week, or once a day, or once every 1.28 seconds. The alteration of the minimum transmission period can change the service capabilities of the mobile unit. For example, if all services are transmitted at a rate of one message every 32 seconds, and each message lasts for one 160 ms broadcast channel frame, then 200 services can be supported in that 32 second period. However, if services are transmitted at a rate of one message every 1.28 seconds, and each message lasts for one 160 ms broadcast channel frame, then only 8 services can be supported in the 1.28 second period.

In general, let the minimum transmission period be m×1.28 seconds, wherein m is chosen such that $1 \leq m \leq 256$ and the broadcast channel frame length be k×40 ms, wherein k=1, 2, or 4. Then there are 32 m/k broadcast channel frames in each minimum transmission period. If each message is one frame long, then these 32 m/k frames can be used to transmit either:

1. a set of 32 m/k messages with the transmission period equal to the minimum transmission period, or
2. a set of 64 m/k services with transmission period twice as long as the minimum transmission period, or
3. a combination of 16 m/k services with transmission period equal to the minimum transmission period and 32 mA services with transmission period twice as long as the minimum transmission period.

Preferred embodiments of the present invention have thus been shown and described. It would be apparent to one of ordinary skill in the art, however, that numerous alterations may be made to the embodiments herein disclosed without departing from the spirit of scope of the invention. Therefore, the present invention is not to be limited except in accordance with the following claims.

I claim:

1. A method for transmitting and receiving messages over a broadcast channel in a communication system, comprising:

generating a parameter message for transmission from a base station to a mobile unit, wherein the parameter message contains a set of transmission parameters for the broadcast channel;

determining, for the set of transmission parameters, a minimum transmission period for the mobile unit, wherein the minimum transmission period is variable;

determining, for the set of transmission parameters, a transmission period, wherein the transmission period has a duration that is a multiple value of the minimum transmission period, and wherein the transmission period is variable;

determining, for the set of transmission parameters, a minimum transmission period offset, wherein the minimum transmission period offset directs the mobile unit to demodulate a specified broadcast channel frame during the minimum transmission period;

determining, for the set of transmission parameters, a transmission period offset, wherein the transmission period offset directs the mobile unit to demodulate a specified broadcast channel frame during the transmission periods;

processing the parameter message at the mobile unit;

setting a periodic wake up schedule for the mobile unit in accordance with the set of transmission parameters, wherein the mobile unit wakes up periodically in accordance with the periodic wake up schedule in order to detect a broadcast message in one of a plurality of broadcast channel frames from at least one of a plurality of subscriber message services.

2. The method as recited in claim 1 wherein the transmission period has a value greater than or equal to a rate at which the base station receives information from at least one of the plurality of subscriber message services.

3. The method of claim 1, wherein at least one of the plurality of broadcast channel frames is reserved for an aperiodic messaging.

4. A method for transmitting and receiving messages over a broadcast channel in a communication system, comprising:

transmitting a plurality of parameter messages over the broadcast channel, wherein each of the plurality of parameter messages contains a set of transmission parameters corresponding to each mobile unit in said communication system or each set of mobile units in said communication system;

determining, for each of the set of transmission parameters, a minimum transmission period, wherein the minimum transmission period is variable;

determining, for each of the set of transmission parameters, a transmission period, wherein the transmission period has a duration that is a multiple value of the minimum transmission period, wherein the transmission period has a value greater than or equal to a rate at which the base station receives information from at least one of the plurality of subscriber message services, and wherein the transmission period is variable;

determining, for each of the set of transmission parameters, a minimum transmission period offset, wherein the minimum transmission period offset directs each mobile unit to demodulate a specified broadcast channel frame during the minimum transmission period;

determining, for each of the set of transmission parameters, a transmission period offset, wherein the transmission period offset directs each mobile unit to demodulate a specified broadcast channel frame during the transmission period from at least one of the plurality of subscriber message services;

processing the plurality of parameter messages at each mobile unit;

setting a periodic wake up schedule for each mobile unit in accordance with the corresponding sets of transmission parameters, wherein each mobile unit wakes up periodically in accordance with the periodic wake up schedule in order to detect a message in one of a plurality of broadcast channel frames from at least one of a plurality of subscriber message services.

5. The method of claim 4, wherein at least one of the plurality of broadcast channel frames is reserved for an aperiodic message.

6. An apparatus for transmitting and receiving messages over a broadcast channel in a communication system comprising:

means for generating a parameter message for transmission from a base station to a mobile unit, wherein the parameter message contains a set of transmission parameters for the broadcast channel;

means for determining, for the set of transmission parameters, a minimum transmission period for the mobile unit, wherein the minimum transmission period is variable;

means for determining, for the set of transmission parameters, a transmission period, wherein the transmission period has a duration that is a multiple value of the minimum transmission period, and wherein the transmission period is variable;

means for determining, for the set of transmission parameters, a minimum transmission period offset, wherein the minimum transmission period offset directs the mobile unit to demodulate a specified broadcast channel frame during the minimum transmission period;

means for determining, for the set of transmission parameters, a transmission period offset, wherein the transmission period offset directs the mobile unit to demodulate a specified broadcast channel frame during the transmission period;

means for processing the parameter message at the mobile unit; and means for setting a periodic wake up schedule for the mobile unit in accordance with the set of transmission parameters, wherein the mobile unit wakes up periodically in accordance with the periodic wake up schedule in order to detect a broadcast message in one of a plurality of broadcast channel frames from at least one of a plurality of subscriber message services.

7. The apparatus as recited in claim 6, wherein the transmission period has a value greater than or equal to a rate at which the base station receives information from at least one of the plurality of subscriber message services.

8. The apparatus of claim 6, wherein at least one of the plurality of broadcast channel frames is reserved for an aperiodic messaging.

9. An apparatus for transmitting and receiving messages over a broadcast channel in a communication system, comprising:

means for transmitting a plurality of parameter messages over the broadcast channel, wherein each of the plurality of parameter messages contains a set of transmission parameters corresponding to each mobile unit in said communication system or each set of mobile units in said communication system:

means for determining, for each of the set of transmission parameters, a minimum transmission period, wherein the minimum transmission period is variable;

means for determining, for each of the set of transmission parameters, a transmission period, wherein the transmission period has a duration that is a multiple value of the minimum transmission period, wherein the transmission period has a value greater than or equal to a rate is the rate at which the base station receives information from at least one of the plurality of subscriber message services, and wherein the transmission period is variable;

means for determining, for each of the set of transmission parameters, a minimum transmission period offset, wherein the minimum transmission period offset directs each mobile unit to demodulate a specified broadcast channel frame during the minimum transmission period;

means for determining, for each of the set of transmission parameters, a transmission period offset, wherein the transmission period offset directs each mobile unit to demodulate a specified broadcast channel frame during the transmission period from at least one of the plurality of subscriber message services;

means for processing the plurality of parameter messages at each mobile unit; and means for setting a periodic wake up schedule for each mobile unit in accordance with the corresponding sets of transmission parameters, wherein each mobile unit wakes up periodically in accordance with the periodic wake up schedule in order to detect a message in one of a plurality of broadcast channel frames from at least one of a plurality of subscriber message services.

10. The apparatus of claim 9, wherein at least one of the plurality of broadcast channel frames is reserved for an aperiodic message.

* * * * *